United States Patent Office 3,015,638
Patented Jan. 2, 1962

3,015,638
WATER-DISPERSED ADHESIVE OF RUBBER AND A MIXTURE OF TACKIFIERS, AND PROCESS FOR PREPARING SAME
Rocco J. Sergi, Forest Hills, N.Y., assignor to Congoleum-Nairn Inc., Kearny, N.J., a corporation of New York
No Drawing. Filed Oct. 1, 1959, Ser. No. 843,623
10 Claims. (Cl. 260—24)

This invention relates to adhesives and particularly to adhesives which are especially suitable for the installation of smooth surface floor covering products such as linoleum, vinyl, rubber, cork, and the like.

This application is a continuation-in-part of my copending application Serial No. 518,928, filed June 29, 1955, now abandoned.

The permanent installation of smooth surface floor coverings is conventionally effected by the use of adhesives. In practice, the adhesive is spread as a film of relatively controlled thickness over the area to be covered. The floor covering is then placed over the adhesive film before the adhesive is in a fully set or dry condition.

A floor covering adhesive must possess several important properties. It must be spreadable without requiring excessive effort to achieve a thin, smooth layer; however, it should not flow except under pressure. When first spread as a thin film, it must exhibit sufficient adhesive power to hold a floor covering in place on the underfloor to avoid slipping or movement, but it should not set immediately in order to permit final adjustment after the installation is completed. This is of special importance with respect to products in tile form. Ultimately, a floor covering adhesive should provide a firm bond between the floor covering and the underfloor.

Depending on the kind and the condition of the underfloor, floor covering adhesives often must have certain essential characteristics in addition to those enumerated. Floors which are suspended, that is, above the grade of the earth, are not usually subject to a moisture or alkaline condition. On the other hand, on grade floors, those built immediately over and in contact with the earth, ordinarily a concrete slab, may absorb moisture from the earth. As the moisture passes through the porous concrete, a relatively large amount of alkaline matter is dissolved and is thereby brought to the upper portion of the concrete. Thus an adhesive for use on this type of floor must have good resistance to the effects of moisture and alkaline materials. The problem, and the degree of protection required for the adhesive, are increased if the on grade floor is normally high in moisture as is frequently the case. Below grade floors, those below the surface of the earth, usually in an excavation such as a basement, are frequently subject to the greatest moisture and alkali problems because of the hydrostatic pressure available to drive the moisture and dissolved alkaline materials through the floor.

Although the problem of providing a below grade adhesive is treated separately within the industry, extensive research has been conducted in connection with the development of an adhesive which is satisfactory for installations over both on and above grade floors. Only a few of such adhesives have been exploited commercially. The most satisfactory adhesives in this group, from the standpoint of resistance to moisture and alkali, are based on organic solvents. They are not completely satisfactory, however, because of the presence of the solvent which is not only a fire hazard at all times, but is especially so when used in a relative small, confined area, as the below deck rooms of a ship. Moreover, care must be exercised in selecting a solvent which will not adversely effect the floor covering, and even the most diligent exercise of such care will not eliminate the possibility of damage to certain products. A second type of adhesive suitable for both on and above grade floors is referred to as a chemical set type and requires mixing of the component parts in small batches at a time closely proximate to use. Chemical set adhesive is based on natural latex stabilized with casein intended to be mixed with a type of hydraulic cement called Lumnite shortly before use. Only that amount of adhesive which can be used within about 30 minutes should be mixed at any one time. With this product there is the possibility of error in formulation as well as other difficulties associated with mixing small amounts at frequent intervals.

The industry has been seeking a satisfactory on and above grade adhesive based on a water dispersion to avoid the aforementioned disadvantages of solvent based adhesives, yet one which requires no mixing on the job. The water dispersed adhesives which are available do not have the required resistance to moisture and alkali and, therefore, are unacceptable for on grade installations. Another important problem which is encountered in formulating a water base adhesive for smooth surface floor covering relates to the difficulty of achieving a satisfactory spreading consistency.

It is an object of the present invention to provide an adhesive which has outstanding resistance to moisture and alkali.

Another object is to provide an adhesive suitable for the installation of smooth surface floor covering over on grade floors.

Another object is to provide a water base adhesive which is easily spreadable but which does not flow except under pressure.

Still another object is to provide a process for preparing a water base adhesive which has outstanding resistance to moisture and alkali and which permits the formulation of an adhesive suitable for use in the smooth surface floor covering industry.

Still another object is to provide a process which is economical and simple in operation.

It has now been discovered that the foregoing and other important objects may be achieved by combining, as will be described more fully hereinafter, a water dispersion of a tackifier, a rubber latex binder, finely divided mineral matter, and a second, normally solid tackifier in molten or liquid, undispersed form.

An unmodified rubber latex has little binding ability when initially spread over a surface and therefore is unsuitable as an adhesive for smooth surface floor coverings. The latex must be rendered tacky or sticky upon initial application and thereby have a limited but immediate binding power prior to setting up. The use of a tackifier for this purpose is conventional. The tackifier may be sticky in its normal state but, in addition, is usually mutually miscible with the rubber and, in any event, plasticizes the rubber. The conventional manner of employing tackifiers with a rubber latex is to mix or blend a water dispersion of a tackifier with the latex. In order to achieve a satisfactory degree of initial binding power, however, such a large amount of tackifier must be used that the water associated with it in its dispersed form renders the adhesive unsuitable with respect to spreadability. Efforts to use fillers have failed for many reasons but principally because the amount thereof required results in an excessive ratio of filler to rubber, and consequently, a discontinuous film having weak binding power and subject to attack by moisture results in use. Thickeners of the methyl cellulose type have been used; however, these are water soluble, and tackified, rubber adhesives prepared with them exhibit poor resistance to moisture and alkali when used for on grade installations of smooth surface floor coverings.

The present invention employs step-wise addition of the required amount of tackifiers to a rubber latex system. In the first step, a water dispersion of a tackifier is blended with a rubber latex, but only sufficient tackifier is added in this manner to provide the ultimate composition with the amount of water desired. Finely divided mineral matter is then added, after which the additional, necessary tackifier, which is normally solid, is added in an undispersed molten or liquid form, that is, in a relatively pure state, undiluted with a dispersing medium and liquified by heat. In the past, it has been thought to be impossible to use normally solid, undispersed tackifiers in connection with a rubber latex, as their addition ordinarily causes gelling of a rubber dispersion. It has now been discovered, however, that the addition of part of the tackifier to a dispersion of partially plasticized rubber in the presence of finely divided mineral matter does not gel the dispersion but instead results in a dispersion of properly plasticized rubber of good spreadability having all of the aforementioned desirable properties. The amount of finely divided mineral matter required for addition of the second-stage tackifier is less than the amount necessary to give the product proper body and spreadability.

The presence of finely divided mineral matter is essential to the addition of the second-stage tackifier as aforementioned in order to obtain a uniform dispersion. On the other hand, such mineral matter will itself ordinarily cause a rubber dispersion to gel. It has been discovered in the present invention, however, that a partially plasticized rubber dispersion is stable with respect to the presence of finely divided mineral matter in an amount exceeding that required for second-stage tackifier addition.

When formulating an adhesive in accordance with the invention, the final product must contain on a weight basis from about 22% to about 32% water. If less than 22% water is present, the product is extremely difficult to spread, having the consistency of dry clay. If more than 32% water is present, the composition is too flowable and when spread on a floor does not remain in the position of deposit. This is especially disadvantageous in the case of smooth surface floor covering adhesives as they are applied with a notched trowel, the notches serving to meter the amount of adhesive spread over a given area. A butter-like consistency is essential in order for the metering section of the notched trowel to be operative. The best results from the standpoint of spreadability have been achieved with composition containing from about 25% to about 30% water.

To achieve satisfactory ultimate and initial binding power, the adhesive of the invention must contain at least about 10% of rubber solids. With less than this amount, it is difficult to achieve a continuous film of rubber over the area to be covered within workable limits of film thickness. Initial binding power is greatly decreased as the tackifiers have insufficient material with which to react or combine. In addition, moisture and alkali resistance are greatly decreased.

Rubber latex systems contain from about 35% to about 75% solids. The maximum concentration applies primarily to natural rubber as synthetic rubber latex systems range from about 40% solids to about 60% solids. It is difficult to exceed these maximum concentrations and maintain a stable dispersion. The amount of water associated with the rubber in the latex system limits the amount of rubber solids which may be present in the adhesive of the invention. If more than about 30% of rubber is to be employed in formulating an adhesive, it becomes difficult to properly plasticize or tackify the rubber without bringing in excessive amounts of water with the rubber and with the water dispersed tackifier while also making provision for the presence of sufficient mineral matter. Moreover, the use of more than 30% of rubber is not justified by any additional product advantages, particularly as the rubber is the most expensive ingredient in the adhesive. The most outstanding alkali and moisture resistance is obtained with from about 15% to about 25% rubber.

The amount of tackifier to be employed depends to some extent on the amount of rubber used. There must be present at least about an equal weight of tackifier and rubber to achieve satisfactory initial binding power. It is usually the case, however, that a greater weight ratio of tackifier to rubber is needed. With lower amounts of rubber, the ratio should be at least about 2 parts of tackifier to each part of rubber. Within the preferred range of rubber concentration, a ratio of 3 to 2 provides the most satisfactory product. In any event, at least about 10% of the adhesive must be tackifier added in the form of a water dispersion. It has been found that at least this much is required to make possible the addition of the finely divided mineral matter. If less than about 10% of tackifier is present at the time the mineral matter is added to the rubber dispersion, the dispersion will be caused to gel within a short period of time. If about 10% or more is present, the mineral matter may easily be distributed within the dispersion. Most all commercially available tackifiers in dispersion form contain from 40% to 60% solids. The amount of tackifier selected must be such to permit accomplishment of the over-all limitations set forth above with respect to water; however, it is preferred to add as much tackifier in the first stage as is conveniently possible within these limitations. The maximum content of total tackifier in the adhesive depends, of course, on the relative amounts of other ingredients present in the adhesive.

In the absence of the finely divided mineral matter in the partially plasticized rubber latex, it would be impossible to add the required additional tackifier in a practical manner. With the mineral matter present, however, it is possible to add from about 5% up to about 35% of tackifier in a molten or liquid undispersed state. More than about 35% will again cause the dispersion to gel. It is most preferred that the second-stage tackifier comprise from about 10% to about 20% of the adhesive.

At least about 10% of the adhesive must be comprised of the aforementioned finely divided mineral matter. This amount is required to permit the addition of tackifier in undispersed form and also to give body and spreadability to the composition. No more than about 40% of mineral matter can be added while still maintaining the necessary balance of other ingredients. In addition, larger amounts of mineral matter result in an adhesive which is difficult to spread and one which has an unsatisfactory ratio of rubber to dispersing agent. This results in the possibility of a discontinuous film in use and consequent failure of the adhesive. From about 15% to about 30% is preferred.

In its set condition, the binding power of adhesive of the invention is primarily a function of the rubber latex binder, the remaining ingredients serving to provide other necessary properties such as spreadability, initial binding power, and the like. However, the ultimate strength of the bond is not as critical to providing a satisfactory floor covering adhesive as initial binding force and the effects on the binding agent of materials present in the environment of its use and extraneous to the composition. Rubber latices have excellent ultimate binding power and when dried, are unaffected to any substantial degree by the moisture and alkali normally associated with on grade floors. The latex may be of natural origin or it may be a dispersion of synthetic rubber. These include, in addition to natural rubber, the polymerization products of butadiene, butadiene and styrene, butadiene and acrylonitrile, sodium polysulfides and dihalides, chloroprene, isobutylene and the like. Butadiene-styrene, butadiene acrylonitrile and either of them blended with natural rubber are most preferred because of their outstanding resistance to moisture and alkali in the adhesive of the invention, their ease of handleability, that is, their stability in dispersion form, and their compatibility with a large number of tackifiers.

There are a number of rubber tackifiers available on the market. They are sold primarily in the form of a water dispersion for the purpose of plasticizing a rubber latex. For use in the invention, the tackifiers must be dispersible, non-saponifiable under normal use, compatible, and capable of plasticizing the rubber. The tackifiers must be water dispersible as the adhesive of the invention is a dispersion and part of the tackifier employed therein is added in dispersion form. Dispersing agents may be used in small amounts as necessary and desirable and a tackifier which can be prepared as a dispersion with their use is considered dispersible. The tackifiers must not be readily saponifiable as the high resistance to alkali, which is a principal object of the invention, would be destroyed by the presence of saponifiable material. They must be compatible with the other ingredients in the sense of not destroying the dispersion.

All of the tackifiers suitable for use in the invention must have a softening point of at least about 65° F. as measured by the ball and ring method (ASTM E28–51T). Otherwise, an adhesive prepared with them will not set firmly, or in any event, will be subject to softening under conditions of elevated temperature. However, the tackifiers to be added in undispersed form must also have a softening point not substantially exceeding the boiling point of water. A maximum softening point of about 220° F. is required. As these tackifiers are added to a dispersion of partially tackified rubber containing finely divided mineral matter, they must be in molten or liquid form and, when added, become a part of the dispersion. If, in their molten or liquid state, the temperature is in excess of the boiling point of water, they will not go into the dispersion but instead will cause gelling of the dispersion. It is most preferred that these tackifiers have a softening point of less than about 140° F. When adding tackifiers in liquid state having a softening point over about 140° F., care should be exercised to maintain a minimum temperature differential between the dispersion of partially tackified rubber and liquid tackifier. This may be accomplished simply by heating the dispersion to the extent necessary. This practice may be followed in any event when necessary or desirable. Liquification of the tackifier added in undispersed condition is accomplished merely by the addition of heat to the solid tackifier.

Tackifiers which have been found suitable for use in the invention include resins obtained from coal tar; petroleum resins, rosin esters; saturated hydrocarbon resins; and the like. The resins obtained from coal tar include paracoumarone, paraindene, and combinations thereof. Petroleum resins are obtained from unsaturated petroleum fractions and many of them are commercially available. They are particularly useful in the invention as second-stage tackifiers as they may be obtained within a wide range of melting points. They are inexpensive and, in addition, relatively large amounts of them may be added without disturbing the dispersion of partially plasticized rubber. They result in a light-colored product in contrast to tackifiers which might otherwise be selected. This is of great advantage to the appearance of new installations when, as is the usual case, considerable amounts of excess adhesive appear on the floor of surrounding areas. Rosin acids which have been esterified with polyhydric alcohols, such as glycerol, pentaerythritol, ethylene glycol, and the like, are widely used as tackifiers for rubber. In the present invention, these esters may only be used as water dispersions for first-stage tackifier addition as they have a melting point in excess of the boiling point of water. For this purpose, however, they are preferred because they provide very high initial adhesive force due to their nature as well as due to their ability to plasticize the rubber. Of the saturated hydrocarbon resins, polybutene has proved most successful. Many other materials may be used as tackifiers for rubber in accordance with the invention providing they possess the properties set forth previously; however, the tackifiers enumerated above are the ones most readily available on a commercial basis. When reference is made herein and in the appended claims to normally solid tackifier, it is intended to include tackifiers which do not exhibit any substantial flow due to their own weight at ordinary room temperatures of between about 70° F. and 90° F. These include so-called "semi-solid" materials.

A wide variety of finely divided mineral matter is available in commercial quantities. They are materials of mineral origin which are comminuted to small particles, sometimes to the extent permitting of colloidal dispersion. Often these materials are of the proper size as obtained. They are widely used for the purpose of aiding in the dispersion of other materials. Clay, diatomaceous earth, precipitated calcium silicate, asbestos, and the like may be employed in this manner. It has been found, however, that such materials must have some absorption ability in order to provide an adhesive of satisfactory spreadability. The Gardner-Coleman absorption test is a satisfactory index of this property. In the test, 20 grams of mineral matter are placed in a receptacle and kerosene is slowly added until the consistency of the mineral matter changes from mealy to plastic. The number of grams of kerosene required to effect the change is the Gardner-Coleman value. It has been found that the finely divided mineral matter of the invention must have the absorbency characteristics reflected in a Gardner-Coleman value of at least about 30; otherwise, it may not be evenly distributed throughout the dispersion of partially plasticized rubber; a consistency which is too flowable will result; and difficulty may be experienced in introducing the liquid, undispersed tackifier without breaking the dispersion. The mineral matter set forth above is water and alkali resistant and therefore does not detract from the alkali and water resistance of the adhesive.

Adhesives of the type described may be tested for spreadability, initial adhesive force, and water and alkali resistance to determine their usefulness in the floor covering industry. Initial adhesive force is tested on the Scott tensile machine. In this test, a strip of rubber or vinyl floor covering measuring 2 inches by 9 inches is pasted on a wooden block having a surface measuring 2 inches by 6 inches and permitted to set for 20 minutes. The block is fixed to a movable platform and the 3 inches of floor covering overhanging the block is fixed in the jaws of a chuck which it attached to a calibrated spring. The platform to which the block is attached is moved downward at a rate of 12 inches per minute against the action of the spring. Means are provided for horizontal movement of the block as the floor covering is stripped therefrom. Guide means are also provided to assure stripping only at a right angle to the surface of the block. The maximum value derived from the calibrated spring is reported in lbs./in.$^2$ of initial binding power. Water resistance is tested in an accelerated manner by troweling a thin layer of adhesive over an area of concrete block. A rubber or vinyl tile is pasted on the block and the cement is permitted to set up. The block is then immersed in water up to about ¼ inch from the surface thereof. The adhesive is considered to fail when the tile may easily be peeled from the block. Alkali resistance is measured by placing a thin film of the adhesive on a glass plate which is then allowed to dry for 48 hours at room temperature. The glass plate is then placed in a solution of 2% sodium hydroxide and inspected periodically for blistering and softening. The test for spreadability is an empirical one. The adhesive is merely spread over an area under anticipated conditions of actual use and rated as satisfactory or unsatisfactory based on experience with adhesives considered to be satisfactory. The physical condition of the adhesive after spreading, namely, whether or not it flows after application, is merely observed.

Other than the product of the invention, there is only one adhesive on the market in the form of a water dispersion which is recommended by a manufacturer of floor covering for on grade installations. It is comprised of a dispersion of a tackified elastomer which is thickened with a methyl cellulose type material. Another product comprised of a tackified latex, not recommended for such installations, includes in addition to the tackified latex, clay, dextrin, soap, caustic, ethylene glycol and a sodium salt of a maleic acid complex. These products are labeled A and B respectively on the following chart which sets forth the results of the above-mentioned tests.

|  | A | B |
| --- | --- | --- |
| Water Resistance | 2 days | 3 days. |
| Alkali Resistance (blistering) | 10 min | 12 min. |
| Alkali Resistance (softening) | 10 min | 15 min. |
| Spreadability | satisfactory | satisfactory. |
| Initial Binding Power | 8 lbs./in.² | 3.5 lbs./in.². |

The following detailed examples set forth various embodiments of the present invention. Each composition is tested as described above.

*Example I*

35 pounds of a rubber latex containing 58% butadiene-acrylonitrile are mixed with 25 pounds of an emulsion containing 60% of a modified ethylene glycol ester of rosin. To this is added 22 pounds of finely divided kaolin clay having a Gardner-Coleman value of about 50. 17 pounds of a petroleum resin having a softening point of 110° F.–115° F. are brought to a temperature of 120° F. and while at this temperature, slowly added to the mixture which is permitted to remain at room temperature. One pound of water is added to complete the composition. The resulting product is a water dispersion, of light color, has initial binding power of 11 pounds per square inch, and has excellent spreadability characteristics. It has moisture resistance of at least four months. It has alkali resistance (blistering) of at least six days and alkali resistance (softening) of at least three days.

*Example II*

The following ingredients are blended in the manner set forth in Example I:

| | Lbs. |
| --- | --- |
| Butadiene-styrene latex (60% solids) | 35 |
| Modified pentaerythritol ester of rosin dispersion (60% solids) | 25 |
| Silene (precipitated calcium silicate having a Gardner-Coleman value of 60) | 22 |
| Coumarone-indene resin (softening point, 110° F.–115° F.) | 17 |
| Water | 1 |

The resulting product is a water dispersion, of somewhat darker color than the adhesive of Example I, has initial binding power of 11 pounds per square inch, and has excellent spreadability characteristics. It has moisture resistance of at least four months. It has alkali resistance (blistering) of at least six days and alkali resistance (softening) of at least three days.

*Example III*

The following ingredients are blended in the manner set forth in Example I:

| | Lbs. |
| --- | --- |
| Butadiene-styrene latex (60% solids) | 7 |
| Butadiene-acrylonitrile latex (60% solids) | 7 |
| Natural rubber latex (40% solids) | 12.5 |
| Coumarone-indene resin dispersion (50% solids, softening point about 160° F.) | 38.5 |
| Diatomaceous earth (Gardner-Coleman value of 50) | 20 |
| Polybutene (softening point, 110° F.–115° F.) | 15 |

The resulting product is a water dispersion, of somewhat darker color than the adhesive of Example I, has initial binding power of 10 pounds per square inch, and has excellent spreadability characteristics. It has moisture resistance of at least four months. It has alkali resistance (blistering) of at least six days and alkali resistance (softening) of at least three days.

*Example IV*

The following ingredients are blended in the manner set forth in Example I:

| | Lbs. |
| --- | --- |
| Polymerized chloroprene latex (50% solids) | 18 |
| Polymerized butadiene-styrene latex (50% solids) | 18 |
| Petroleum resin dispersion (60% solids, softening point 160° F.) | 23 |
| Clay (Gardner-Coleman value of 50) | 24 |
| Petroleum resin (softening point, 110° F.–115° F.) | 17 |

This adhesive is a water dispersion, of light color, has initial binding power of 10 pounds per square inch, and has excellent spreadability. It has moisture resistance of about four months. It has alkali resistance (blistering) of about five days and alkali resistance (softening) of about three days.

The composition of Example I is the most preferred embodiment of the invention. In addition to the properties set forth, it has a type of consistency and feel which are highly preferred by those skilled in the art. These properties are not readily subject to scientific measurement.

While the invention has been described with reference to specific and detailed examples, it is not intended to be limited thereby. Numerous variations in preparation, formulation, and processing within the scope of the invention will immediately become apparent to those skilled in the art, and, therefore, reference should be had to the appended claims for a definition of the limits of the invention.

What is claimed is:

1. A process for providing a water dispersion at normal room temperature of a rubber base adhesive suitable for the installation of smooth surface floor covering over on grade concrete floors containing about 10% to about 30% rubber, about 22 to about 32% water, about 10 to about 40% of finely divided mineral matter having a Gardner-Coleman value of at least about 30 and tackifier, said tackifier comprising at least 10% by weight based on the weight of the final adhesive of a water dispersible first tackifier and up to about 35% by weight based on the weight of the final adhesive of a nonsaponifiable, dispersible, compatible second tackifier having a softening point of about 65° F. to about 220° F., which comprises blending together to form a uniform dispersion containing only said 22 to 32% water, a latex of all of said rubber and a water dispersion of all of said first tackifier to partially plasticize the rubber, distributing said mineral matter throughout said dispersion of partially plasticized rubber and, thereafter, adding said second tackifier in a molten state to the dispersion of partially plasticized rubber and mineral matter thereby forming said water dispersion of said rubber base adhesive.

2. A process for providing a water dispersion at normal room temperature of a rubber base adhesive suitable for the installation of smooth surface floor covering over on grade concrete floors containing about 10% to about 30% rubber, about 22 to about 32% water, about 10 to about 40% of finely divided mineral matter having a Gardner-Coleman value of at least about 30 and tackifier, said tackifier comprising at least 10% by weight based on the weight of the final adhesive of a water dispersible first tackifier having a softening point of at least about 65°

F., and up to about 35% by weight based on the weight of the final adhesive of a nonsaponifiable, dispersible, compatible second tackifier having a softening point of about 65° F. to about 220° F., which comprises blending together to form a uniform dispersion containing only said 22 to 32% water, a latex of all of said rubber containing from about 35 to about 75% solids, and a water dispersion of all of said first tackifier containing from about 40 to about 60% solids, to partially plasticize the rubber, distributing said mineral matter throughout said dispersion of partially plasticized rubber and, thereafter, adding said second tackifier in a molten state to the dispersion of partially plasticized rubber and mineral matter thereby forming said water dispersion of said rubber base adhesive.

3. A process for providing a water dispersion at normal room temperature of a rubber base adhesive suitable for the installation of smooth surface floor covering over on grade concrete floors containing about 15% to about 25% rubber, about 22 to about 32% water, about 15% to about 30% of finely divided mineral matter having a Gardner-Coleman value of at least about 30 and tackifier to provide a ratio of total tackifier to rubber of at least as great as 3 to 2, said tackifier comprising at least 10% by weight based on the weight of the final adhesive of a water dispersible first tackifier having a softening point of at least about 65° F. and from about 10 to about 20% by weight based on the weight of the final adhesive of a nonsaponifiable, dispersible, compatible second tackifier having a softening point of about 65° F. to about 220° F., which comprises blending together to form a uniform dispersion containing only said 22 to 32% water, a latex of all of said rubber and a water dispersion of all of said first tackifier to partially plasticize the rubber, distributing said mineral matter throughout said dispersion of partially plasticized rubber and, thereafter, adding said second tackifier in a molten state to the dispersion of partially plasticized rubber and mineral matter thereby forming said water dispersion of said rubber base adhesive.

4. A process for providing a water dispersion at normal room temperature of a rubber base adhesive suitable for the installation of smooth surface floor covering over on grade concrete floors containing about 15 to about 25% rubber selected from the group consisting of synthetic rubber, natural rubber and mixtures thereof, about 22 to about 32% water, about 15 to about 30% of finely divided mineral matter having a Gardner-Coleman value of at least about 30 and tackifier to provide a ratio of total tackifier to rubber of at least as great as 3 to 2, said tackifier comprising at least 10% by weight based on the weight of the final adhesive of a water dispersible first tackifier having a softening point of at least about 65° F. and up to about 35% by weight based on the weight of the final adhesive of a nonsaponifiable, dispersible, compatible second tackifier having a softening point of about 65° F. to about 220° F., which comprises blending together to form a uniform dispersion containing only said 22 to 32% water, a latex of all of said rubber and a water dispersion of all of said first tackifier to partially plasticize the rubber, distributing said mineral matter throughout said dispersion of partially plasticized rubber and, thereafter, adding said second tackifier in a molten state to the dispersion of partially plasticized rubber and mineral matter thereby forming said water dispersion of said rubber base adhesive.

5. A process for providing a water dispersion at normal room temperature of a rubber base adhesive suitable for the installation of smooth surface floor covering over on grade concrete floors containing about 10 to about 30% rubber being selected from the group consisting of synthetic rubber, natural rubber and mixtures thereof, about 22 to about 32% water, about 10 to about 40% of finely divided mineral matter having a Gardner Coleman value of at least about 30 and tackifier to provide an amount of tackifier at least equal to the amount of rubber, said tackifier comprising at least 10% by weight based on the weight of the final adhesive of a water dispersible first tackifier having a softening point of at least about 65° F. and up to about 35% by weight based on the weight of the final adhesive of a nonsaponifiable, dispersible, compatible second tackifier having a softening point of about 65° F. to about 220° F., which comprises blending together to form a uniform dispersion containing only said 22 to 32% water, a latex of all of said rubber and a water dispersion of all of said first tackifier to partially plasticize the rubber, distributing said mineral matter throughout said dispersion of partially plasticized rubber and, thereafter, adding said second tackifier in a molten state to the dispersion of partially plasticized rubber and mineral matter thereby forming said water dispersion of said rubber base adhesive.

6. A process for providing a water dispersion at normal room temperature of a rubber base adhesive suitable for the installation of smooth surface floor covering over on grade concrete floors containing about 15 to about 25% rubber selected from the group consisting of synthetic rubber, natural rubber and mixtures thereof, about 22 to about 32% water, about 15 to about 40% of finely divided mineral matter having a Gardner-Coleman value of at least about 30 and tackifier to provide a ratio of tackifier to rubber of at least as great as 3 to 2, said tackifier comprising at least 10% by weight based on the weight of the final adhesive of a water dispersible first tackifier having a softening point of at least 65° F. and up to about 35% by weight based on the weight of the final adhesive of a nonsaponifiable, dispersible, compatible second tackifier having a softening point of about 65° F. to about 220° F., which comprises blending together to form a uniform dispersion containing only said 22 to 32% water, a latex containing from about 35 to about 75% solids of all of said rubber and a water dispersion of all of said first tackifier to partially plasticize the rubber, distributing said mineral matter throughout said dispersion of partially plasticized rubber and, thereafter, adding said second tackifier in a molten state to the dispersion of partially plasticized rubber and mineral matter thereby forming said water dispersion of said rubber base adhesive.

7. A process for providing a water dispersion at normal room temperature of a rubber base adhesive suitable for the installation of smooth surface floor covering over on grade concrete floors containing about 15 to 25% rubber selected from the group consisting of synthetic rubber, natural rubber and mixtures thereof, about 22 to about 32% water, about 15 to 30% of finely divided mineral matter having a Gardner-Coleman value of at least about 30 and tackifier to provide a ratio of tackifier to rubber of at least as great as 3 to 2, said tackifier comprising at least 10% by weight based on the weight of the final adhesive of a water dispersible rosin ester of a polyhydric alcohol having a softening point of at least about 65° F. and about 10 to about 20% by weight based on the weight of the final adhesive of a nonsaponifiable, dispersible, compatible second tackifier having a softening point of about 65° F. to about 220° F., which comprises blending together to form a uniform dispersion containing only said 22 to 32% water, a latex of all of said rubber containing about 35 to about 75% solids and a water dispersion of said rosin ester containing about 40 to about 60% solids to partially plasticize the rubber, distributing said mineral matter throughout said dispersion of partially plasticized rubber and, thereafter, adding said second tackifier in a molten state to the dispersion of partially plasticized rubber and mineral matter thereby forming said water dispersion of said rubber base adhesive.

8. A process for providing a water dispersion at normal room temperature of a rubber base adhesive suitable for the installation of smooth surface floor covering over on grade concrete floors containing about 20% rubber selected from the group consisting of synthetic rubber, natural rubber and mixtures thereof, about 26% water, about 22% clay having a Gardner-Coleman value of at least about 30 and tackifier, said tackifier comprising at least 15% by weight based on the weight of the final adhesive of a nonsaponifiable, compatible rosin ester of a polyhydric alcohol and about 17% by weight based on the weight of the final adhesive of nonsaponifiable, dispersible, compatible second tackifier having a softening point of about 65° F. to about 220° F., which comprises blending together to form a uniform dispersion containing only said 26% water, a latex containing about 58% solids of all of said rubber and a water dispersion of all of said rosin ester containing 60% solids to partially plasticize the rubber, distributing said mineral matter throughout said dispersion of partially plasticized rubber and, thereafter, adding said second tackifier in a molten state to the dispersion of partially plasticized rubber and mineral matter thereby forming said water dispersion of said rubber base adhesive.

9. An adhesive composition in the form of a uniform water dispersion for use in bonding smooth surface covering products to suspended and on grade surfaces characterized as being highly water-resistant after setting by removal of the initial water which comprises about 10% to about 30% rubber selected from the group consisting of natural rubber, synthetic rubber and mixtures thereof, about 10% to about 40% finely divided mineral matter having a Gardner-Coleman value of at least about 30, at least 10% of a nonsaponifiable, compatible first tackifier having a softening point of above 65° F. and from 5 to 35% of a nonsaponifiable, compatible second tackifier having a softening point of between 65° F. and 220° F., the total amount of said first and said second tackifier being at least one and one-half times the amount of said rubber and not exceeding about 58% of the total composition, and about 22% to about 32% water, the amount of said water being less than $\frac{1}{3}x + \frac{2}{3}y + \frac{2}{3}z$ where $x$ is the amount of natural rubber, $y$ is the amount of synthetic rubber and $z$ is the amount of tackifier.

10. An adhesive composition in the form of a uniform aqueous dispersion containing about 22% to about 32% water for use in bonding smooth surface covering products to suspended and on grade surfaces characterized as being highly water-resistant after setting by removal of the initial water which comprises a water dispersion of about 10 to about 30% synthetic rubber, about 10 to about 40% finely divided mineral matter having a Gardner-Coleman value of at least about 30, a water dispersion of at least 10% of a nonsaponifiable, compatible first tackifier and from about 5% to about 35% of a solid nonsaponifiable, compatible second tackifier having a softening point from about 65° F. to about 220° F., the total amount of said first and second tackifier being at least one and one-half times the amount of said rubber and not exceeding about 58% of the total composition and the amount of water being less than $\frac{2}{3}y + \frac{2}{3}z$ wherein $y$ is the amount of synthetic rubber and $z$ is the amount of tackifier.

References Cited in the file of this patent
UNITED STATES PATENTS
2,880,184    Groves et al. _____ Mar. 31, 1959